United States Patent [19]

Nickias et al.

[11] Patent Number: 5,347,024

[45] Date of Patent: Sep. 13, 1994

[54] PREPARATION OF ADDITION POLYMERIZATION CATALYSTS VIA LEWIS ACID MITIGATED METAL CENTER OXIDATION

[75] Inventors: Peter N. Nickias; David D. Devore; Francis J. Timmers, all of Midland, Mich.; Robert K. Rosen, Sugar Land, Tex.; Robert D. Mussell, Midland, Mich.

[73] Assignee: The Dow Chemical Company, Midland, Mich.

[21] Appl. No.: 34,434

[22] Filed: Mar. 19, 1993

[51] Int. Cl.$^5$ .............................................. C07C 7/00
[52] U.S. Cl. ........................................ 556/11; 556/14; 556/51; 556/52; 556/53; 556/7; 556/19; 556/27
[58] Field of Search ...................... 556/11, 14, 51, 52, 556/53, 7, 19, 27

[56] References Cited

U.S. PATENT DOCUMENTS 5,064,802  11/1991  Stevens .................................. 556/11

Primary Examiner—Paul J. Killos

[57] ABSTRACT

Addition polymerization catalysts comprising a derivative of a titanium or zirconium in the +4 oxidation state prepared by metal center oxidation and cation complex formation of a reduced metal precursor complex via electron transfer in a single step by use of a neutral organic oxidant, optionally in the presence of a Lewis acid mitigator.

9 Claims, No Drawings

PREPARATION OF ADDITION POLYMERIZATION CATALYSTS VIA LEWIS ACID MITIGATED METAL CENTER OXIDATION

BACKGROUND OF THE INVENTION

This invention relates to a process for preparing certain catalytically active metal complexes. More particularly this invention relates to such a process involving oxidation of the metal center of a complex to form active catalyst compositions useful for polymerizing olefins, diolefins and/or acetylenically unsaturated monomers.

The use of homogeneous Ziegler-Natta type catalysts in the polymerization of addition polymerizable monomers is, of courser well known in the prior art. In general, these soluble systems comprise a Group 4 or Lanthanide metal compound and a metal alkyl cocatalyst, particularly an aluminum alkyl cocatalyst. Several preparations for homogeneous olefin polymerization catalysts are known. These involve reacting a transition metal chloride with an aluminum alkyl, reacting a transition metal alkyl and a aluminum alkyl, reacting a transition metal alkyl with a proton source, or reacting a transition metal alkyl with a cationic oxidant. In these examples the oxidation state of the transition metal remains unchanged or may actually be reduced.

In *Polyhedron*, 8(13–14), 1838–1843 (1989), M. Bochmann et al., disclosed an oxidative process for preparing bispentamethylcyclopentadienyltitanium methyl tetraphenylborate using silver tetraphenylborate oxidant in tetrahydrofuran solvent. The complex was inactive in the polymerization of ethylene.

In *J. Am. Ch. Soc.* 109, 4111–4113 (1987) there is disclosed a process for preparation of cationic zirconium (IV) benzyl complexes by one electron molecular oxidation of $d^0$ organometallic compounds in tetrahydrofuran or methylene chloride solvent.

In application Ser. No. 07/642,111, filed Jan. 16, 1991, a metal center oxidation and cation forming process employing a cationic oxidizer is disclosed. In pending application Ser. No. 545,403, filed Jul. 3, 1990, there are disclosed certain novel constrained geometry complexes possessing unique catalytic properties. In pending application Ser. No. 547,718, filed Jul. 3, 1990 there is disclosed a unique molecular oxidative activation procedure for preparing complexes useful as addition polymerization catalysts. For the disclosures contained therein the preceding United States patents and pending applications are hereby incorporated by reference in their entireties.

The present invention lies in the discovery of a novel technique for preparing certain metal complexes involving both metal center oxidation and cation complex formation via electron transfer in a single step by use of a neutral organic oxidant. Beneficially, the use of neutral reactants permits the synthesis to be performed in hydrocarbon solvents normally employed for olefin polymerizations instead of polar or oxygenated solvents. Consequently, in the present invention contamination with deactivating substances is reduced and the need to substitute solvents prior to use of the resulting complexes is omitted, thereby simplifying the synthesis and use of the complexes as catalysts.

In one embodiment of the invention, the reduced remnant of the oxidizing agent comprises an anion able to ligate the metal complex. To counteract this ligating effect of the resulting residual organic anion, a Lewis acid mitigator is additionally added to the reaction mixture. Thus the process is adaptable for use even where the byproducts may interfere with the desired metal complex formation.

According to the present invention there is provided a process for the preparation of a cationic metal complex corresponding to the formula:

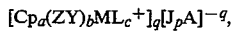

Wherein:
Cp independently each occurrence is a cyclopentadienyl group q-bound to M, or a hydrocarbyl, silyl, halo, halohydrocarbyl, hydrocarbylmetalloid or halohydrocarbylmetalloid substituted derivative of said cyclopentadienyl group, said Cp containing up to 50 nonhydrogen atoms, and, when a is 2, optionally both Cp groups may be joined together by a bridging group;
a is 1 or 2;
b is 0 or 1;
c is 1 or 2;
the sum of a, b and c is 3;
Z is a divalent moiety comprising oxygen, nitrogen, phosphorous, boron, or a member of Group 14 of the Periodic Table of the Elements, said moiety having up to 30 nonhydrogen atoms;
Y is a linking group comprising nitrogen, phosphorus, oxygen or sulfur covalently bonded to M and Z through said nitrogen, phosphorus, oxygen or sulfur atom;
L independently each occurrence is hydride, halo, or a monovalent anionic ligand selected from covalently bonded hydrocarbyl, silyl, amido, phosphido, alkoxy, aryloxy, and sulfido groups optionally being further substituted with one or more amine, phosphine, ether, or thioether groups, said ligand having up to 50 nonhydrogen atoms,
M is titanium or zirconium in the +4 oxidation state;
p is an integer from 0 to 4;
q is 1 or2;
J is the Lewis acid mitigating agent, and
A is a reduced remnant of a neutral organic oxidizing agent and may be ligating or nonligating,
the steps of the process comprising contacting under conditions to form the oxidized metal complex:
1) a reduced metal precursor complex corresponding to the formula: $Cp_a(ZY)_bM^* L_c$, wherein Cp, Z, Y, L, a, b, and c are as previously defined, and M* is the same metal as M but in a +3 oxidation state;
2) a neutral organic oxidizing agent, A*, capable of accepting one or more electrons and oxidizing M* to M and which in reduced form is A;
and, if A is a ligating group,
a Lewis acid mitigating agent, J.

DETAILED DESCRIPTION

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

The recitation "metalloid", as used herein, includes nonmetals such as boron, phosphorus and the like which exhibit semi-metallic characteristics.

Preferably M is titanium in the +4 oxidation state and M* is titanium in the +3 oxidation state.

L preferably is a monovalent anionic stabilizing ligand selected from the group consisting of:
1) covalently bonded hydrocarbyl, silyl, amido, phosphido, alkoxy, aryloxy, sulfido groups and mixtures thereof, said group being further substituted with an amine, phosphine, ether, or thioether containing substituent able to form a coordinate-covalent bond or chelating bond with M, said ligand having up to 50 nonhydrogen atoms, and
2) C$_{3-40}$ hydrocarbyl radicals comprising an ethylenic unsaturation able to form an $\eta^3$ bond with M.

The ligand moiety consisting of —Cp—Z—Y—, when present, is a dianionic ligand having the ionic charges residing formally on Cp and Y. Such ligand causes the resulting complex to possess constrained geometry about the active metal catalyst site resulting in highly active Group 4 metal catalysts. Constrained geometry complexes are further described in previously mentioned application Ser. No. 545,402, filed Jul. 3, 1990, (equivalent to EP-A-416,815).

Highly preferred Group 4 metal complexes formed according to the present invention are monocyclopentadienyl metal complexes corresponding to the formula:

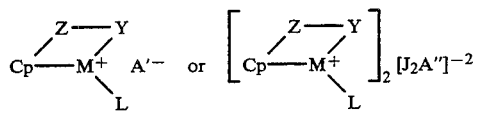

wherein:
M is titanium,
L independently each occurrence is a covalently bonded hydrocarbyl group substituted with an amine, phosphine, ether, or thioether containing substituent able to form a coordinate-covalent bond or chelating bond with M, said ligand having up to 50 nonhydrogen atoms, or a C$_{3-40}$ hydrocarbyl radical comprising an ethylenic unsaturation able to form an $\eta^3$ bond with M;
J is as previously defined,
A' is a nonligating form of A;
A" is a ligating form of A;
Cp is a cyclopentadienyl or substituted cyclopentadienyl group bound in an $\eta^5$ bonding mode to M;
Z is a divalent moiety comprising carbon or silicon; and
Y is a linking group comprising nitrogen or phosphorus.

The monocyclopentadienyl metal complex starting reactant for preparation of the above metal complexes is

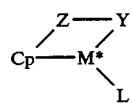

wherein:
Cp, Z, Y, M*, and L are as previously defined with respect to the resulting complex.

Each carbon atom in the cyclopentadienyl radical may be unsubstituted or substituted with the same or a different radical selected from the group consisting of hydrocarbyl radicals, substituted-hydrocarbyl radicals wherein one or more hydrogen atoms is replaced by a halogen atom, hydrocarbyl-substituted metalloid radicals wherein the metalloid is selected from Group 14 of the Periodic Table of the Elements, and halogen radicals. In addition two or more such substituents may together form a fused ring system. Preferred hydrocarbyl and substituted-hydrocarbyl radicals contain from 1 to 20 carbon atoms and include straight and branched alkyl radicals, cyclic hydrocarbon radicals, alkyl-substituted cyclic hydrocarbon radicals, aromatic radicals and alkyl-substituted aromatic radicals. Suitable organometalloid radicals include mono-, di- and tri-substituted organometalloid radicals of Group 14 elements wherein each of the hydrocarbyl groups contain from 1 to about 20 carbon atoms. More particularly, suitable organometalloid radicals include trimethylsilyl, triethylsilyl, ethyldimethylsilyl, methyldiethylsilyl, triphenylgermyl, trimethylgermyl and the like.

Most highly preferred Group 4 metal complexes formed according to the present invention are amidosilane-or amidoalkanediyl-compounds corresponding to the formula:

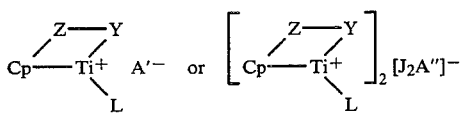

wherein:
L independently each occurrence is a covalently bonded hydrocarbyl group substituted with an amine, phosphine, ether, or thioether containing substituent able to form a coordinate-covalent bond or chelating bond with M, said ligand having up to 50 nonhydrogen atoms, or a C$_{3-40}$ hydrocarbyl radical comprising an ethylenic unsaturation able to form an $\eta^3$ bond with M, and

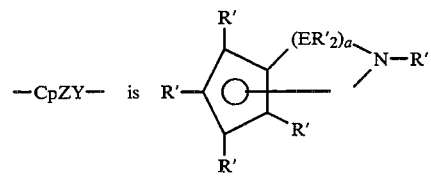

wherein, R' independently each occurrence is selected from the group consisting of hydrogen, silyl, alkyl, aryl and combinations thereof having up to 10 carbon or silicon atoms;
E is silicon or carbon; and
a is 1 or 2.

Preferably R' on the foregoing cyclopentadienyl groups each occurrence is hydrogen, methyl, ethyl, propyl, butyl, pentyl, hexyl, (including isomers), norbornyl, benzyl, phenyl, or two such R' groups together are a C$_4$ hydrocarbylene moiety forming a fused ring with adjacent carbons of the cyclopentadienyl group.

The metal complex precursors used in the preparation of the above cationic complexes correspond to the formula:

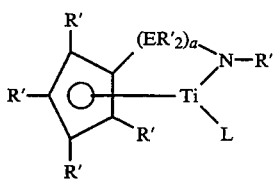

wherein:

R', E, L and a are as previously defined with respect to the resulting complexes.

Examples of the above most highly preferred Group 4 metal complexes include compounds wherein the R' on the amido group is methyl, ethyl, propyl, butyl, pentyl, hexyl, (including isomers), norbornyl, benzyl, phenyl, etc.; the cyclopentadienyl group (including R' substituents) is cyclopentadienyl, tetramethylcyclopentadienyl, indenyl, tetrahydroindenyl, fluorenyl, octahydrofluorenyl, etc.; and L is methyl, neopentyl, trimethylsilyl, norbornyl, benzyl, methylbenzyl, phenyl, etc.

Specific titanium(III) precursor complexes include: (tert-butylamido)($\eta^5$-cyclopentadienyl)-1,2-ethanediyltitanium 2-(N,N-dimethylamino)benzyl, (tert-butylamido)(tetramethyl-$\eta^5$-cyclopentadienyl)-1,2-ethanediyltitanium 2-(N,N-dimethylamino)benzyl, (tert-butylamido)(ethyl-$\eta^5$-cyclopentadienyl)-1,2-ethanediyltitanium 2-(N,N-dimethylamino)benzyl, (methylamido)(tetramethyl-$\eta^5$-cyclopentadienyl)-1,2-ethanediyltitanium 2-(N,N-dimethylamino)benzyl, (methylamido)($\eta^5$-cyclopentadienyl)-1,2-ethanediyltitanium 2-(N,N-dimethylamino)benzyl, (methylamido)(ethyl-$\eta^5$-cyclopentadienyl)-1,2-ethanediyltitanium 2-(N,N-dimethylamino)benzyl, (tert-butylamido)($\eta^5$-cyclopentadienyl)-1,2-ethanediyltitanium allyl, (tert-butylamido)(tetramethyl-$\eta^5$-cyclopentadienyl)-1,2-ethanediyltitanium allyl, (tert-butylamido)(ethyl-$\eta^5$-cyclopentadienyl)-1,2-ethanediyltitanium allyl, (methylamido)(tetramethyl-$\eta^5$-cyclopentadienyl)-1,2-ethanediyltitanium allyl, (methylamido)($\eta^5$-cyclopentadienyl)-1,2-ethanediyltitanium allyl, (methylamido)(ethyl-$\eta^5$-cyclopentadienyl)-1,2-ethanediyltitanium allyl, (tert-butylamido)($\eta^5$-cylopentadienyl)-1,2-ethanediyltitanium 2-(dimethylphosphino)benzyl, (tert-butylamido)(tetramethyl-$\eta^5$-cyclopentdienyl)-1,2-ethanediyltitanium-2-(dimethylphosphino)benzyl, (tert-butylamido)ethyl-$\eta^5$-cyclopentadienyl)-1,2-ethanediyltitanium 2-(dimethylphosphino(benzyl, (methylamido)(tetramethyl-$\eta^5$-cyclopentadienyl)-1,2-ethanediyltitanium-2-(dimethylphosphino)benzyl, (methylamido)($\eta^5$-cyclopentadienyl)-1,2-ethanediyltitanium-2-(dimethylphosphino)benzyl, (methylamido)(ethyl$\eta^5$-cyclopentadienyl)-1,2-ethanediyltitanium 2-(dimethylphosphino)benzyl, (tert-butylamido)($\eta^5$-cyclopentadienyl)-1,2-ethanediyltitanium 2-(N,N-dipentafluorophenylamino)benzyl, (tert-butylamido)($\eta^5$-cyclopentadienyl)-1,2-ethanediyltitanium 2-(N,N-dimethylaminomethyl), (tert-butylamido)(tetramethyl-$\eta^5$-cyclopentadienyl)-1,2-ethanediyltitanium 2-(N,N-trimethylsilylamino)benzyl, (tert-butylamido)($\eta^5$-cyclopentadienyl)dimethylsilanetitanium 2-(N,N-dimethylamino)benzyl, (tert-butylamido)(tetramethyl-$\eta^5$-cyclopentadienyl)dimethylsilanetitanium 2-(N,N-dimethylamino)benzyl, (tert-butylamido)(ethyl-$\eta^5$-cyclopentadienyl)dimethylsilanetitanium 2-(N,N-dimethylamino)benzyl, (methylamido)(tetramethyl-$\eta^5$-cyclopentadienyl)dimethylsilanetitanium 2-(N,N-dimethylamino)benzyl, (methylamido)(ethyl$\eta^5$-cyclopentadienyl)dimethylsilanetitanium 2-(N,N-dimethylamino)benzyl, (methylamido)(ethyl-$\eta^5$-cyclopentadienyl)dimethylsilanetitanium 2-(N,N-dimethylamino)benzyl, (tert-butylamido)($\eta^5$-cyclopentadienyl)dimethylsilanetitanium allyl, (tert-butylamido)(tetramethyl-$\eta^5$-cyclopentadienyl)dimethylsilanetitanium allyl, (tert-butylamido)(ethyl-$\eta^5$-cyclopentadienyl)dimethylsilanetitanium allyl, (methylamido)(tetramethyl-$\eta^5$-cyclopentadienyl)dimethylsilanetitanium allyl, (methylamido)($\eta^5$-cyclopentadienyl)dimethylsilanetitanium allyl, (methylamido)(ethyl$\eta^5$-cyclopentadienyl)dimethylsilanetitanium allyl, (tert-butylamido)($\eta^5$-cyclopentadienyl)dimethylsilanetitanium 2-(dimethylphosphino)benzyl, (tert-butylamido)(tetramethyl-$\eta^5$-cyclopentadienyl)dimethylsilanetitanium 2-(dimethylphosphino)benzyl, (tert-butylamido)($\eta^5$-cyclopentadienyl)dimethylsilanetitanium 2-N,N-(dipentafluorophenylamino)benzyl, (tert-butylamido)(tetramethyl-$\eta^5$-cyclopentadienyl)dimethylsilanetitanium 2-N,N-(dipentafluorophenylamino)benzyl, and (methylamido)(ethyl-$\eta^5$-cyclopentadienyl)dimethylsilanetitanium 2-(N,N-di(-trimethylsilyl)amino)benzyl, and the like.

Other Group 4 metal complexes that may be used in the process according to the present invention will, of courser be apparent to those skilled in the art.

The term "organic oxidizing agent" as used herein refers to an organic compound having a reduction potential sufficient to cause oxidation of the metal, M*, to the +4 oxidation state Preferred organic oxidizers possess an electrochemical reduction potential from 0.30 volts more negative than the electrochemical oxidation potential of the desired oxidation to any value more positive than the electrochemical oxidation potential of the desired oxidation. More preferably, the electrochemical reduction potential for such oxidizing agent is in a range the lower endpoint of which is equal to the electrochemical oxidation potential of the desired oxidation and the upper endpoint of which is 4.0 volts more positive than the electrochemical oxidation potential of the desired oxidation.

Examples of suitable neutral, organic oxidizing agents for use according to the present invention are organic compounds containing quinone functionality containing up to 50 carbons and closed caged, carbon structures known as "fullerenes". Fullerene oxidizing agents do not form ligating reduction species that interfere with the operation of the metal complex. Preferred are $C_{60}$ fullerene and $C_{70}$ fullerene. Preferred quinone functional organic oxidizing agents are benzoquinone, diphenoquinone, anthroquinone, and $C_{1-4}$ alkyl substituted derivatives thereof. Highly preferred organic oxidizing agents are 2,3,5,6-tetramethylbenzoquinone, 2,3,5,6-tetratertbutylbenzoquinone, 2,2',6,6'-tetramethyldiphenoquinone, 2,2',6,6'-tetratert-butyldiphenoquinone. A most preferred quinone functional organic oxidizing agent is 2,2',6,6'-tetratert-butyldiphenoquinone.

Upon reduction, the above quinone functional oxidizing agents form an organic anion remnant which may coordinate to the metal complex. However, because the mitigating agent is an electron pair acceptor, the organic anion and one or more Lewis acid mitigating agents together form the noncoordinating, noninterfering, complex counter ion, $J_pA^{-q}$.

Preferred Lewis acid mitigating agents are $C_{1-10}$ trialkylaluminum compounds, $C_{1-10}$ trialkylboron compounds, $C_{1-10}$ trihaloalkylboron compounds, and $C_{1-10}$ trialkylborate compounds. Most preferred Lewis acid mitigating agents are trimethylaluminum, triethylaluminum, trimethylboron, triethylboron, tris(pentafluorophenyl)borane, tris (2,3,5,6tetrafluorophenyl)borane, tris(2,3,4,5-tetrafluorophenyl)borane, tris(3,4,5-trifluorophenyl)borane, tris(1,2,2-trifluoroethenyl)borane, phenylbis(perfluorophenyl)borane, and tris(perfluorophenyl) borate.

The above Lewis acid mitigating agents may be prepared according to known techniques such as those of Marks, et al. *J. Am. Chem. Soc.* 1991, 113, 3623–3625, or J. Pohlman, et al., *Naturforschg.* 1965, 20b, 5–11. The preferred technique is to combine a boron or aluminum halide compound such as boron trichloride or boron trifluoride with an alkali metal or alkaline earth derivative of the desired substituent or substituents. Additionally, borate esters such as tris(perfluorophenyl) borate may be prepared by the reaction of pentafluorophenylphenol and borane-methyl sulfide complex according to the method of *J. Org. Chem.*, 43(13) 2731–32 (1978).

In general, the complexes can be prepared by combining the components in a suitable noninterfering, noncoordinating solvent at a temperature from $-100°$ C to $300°$ C, preferably from $0°$ to $200°$ C. Suitable solvents are noncoordinating, inert liquids. Examples include straight and branched-chain hydrocarbons such as isobutane, butane, pentane, hexane, heptane, octane, and mixtures thereof: cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and the like, and aromatic, or alkyl-substituted aromatic compounds such as benzene, toluene, xylene and the like. Suitable solvents also include liquid olefins which may act as monomers or comonomers including ethylene, propylene, butadiene, cyclopentene, 1-hexane, 3-methyl-l-pentene, 4-methyl-l-pentene, 1,4-hexadiene, 1-octene, 1-decene, styrene, divinylbenzene, allylbenzene, 4vinylcyclohexene, vinyltoluene (including all isomers alone or in admixture), and the like. Mixtures of the foregoing are also suitable.

The catalyst formed by the method of this invention may be retained in solution or separated from the solvent, isolated, and stored for subsequent use. As previously indicated supra, the catalyst may also be prepared in situ during a polymerization reaction by passing the separate components into the polymerization vessel where the components will contact and react to produce the improved catalyst of this invention.

The equivalent ratio of reduced metal precursor complex to oxidizing agent employed in the process is preferably in a range from 0.1:1 to 10:1, more preferably from 0.75:1 to 5:1, most preferably 1:1 to 2:1. The equivalent ratio of Lewis acid mitigating agent to oxidizing agent employed in the process is preferably in a range from 0:1 to 50:1, more preferably from 0.75:1 to 10:1 most preferably 1:1 to 2.5:1.

The complexes may be used to polymerize ethylenically and/or acetylenically unsaturated monomers having from 2 to about 18 carbon atoms either alone or in combination. Preferably they are used to polymerize $C_{2-10}$ α-olefins, especially ethylene, propylene, isobutylene, 1-butene, 1-hexene, 4-methyl-l-pentene, and 1-octene, including mixtures thereof. In general, the polymerization may be accomplished at conditions well known in the prior art for Ziegler-Natta or Kaminsky-Sinn type polymerization reactions i.e. temperatures from $0°-250°$ C. and pressures from atmospheric to 1000 atmospheres. Suspension, solution, slurry, gas-phase or other process conditions may be employed. A support may be employed but preferably the catalysts are used in a homogeneous manner. In most polymerization reactions the equivalent ratio of complex:polymerizable monomer employed is from $10^{-12}:1$ to $10^{-1}:1$, more preferably from $10^{-8}:1$ to $10^{-5}:1$. The complexes generally need no activating agent in order to be catalytically effective.

Having described the invention the following examples are provided as further illustration thereof and are not to be construed as limiting. Unless stated to the contrary all parts and percentages are expressed on a weight basis.

EXAMPLE 1–4

EXAMPLE 1

20 mg (46 μmol) of (t-butylamido)dimethyl(tetramethyl-$\eta^5$-cyclopentadienyl)silanetitanium(III) 2-(N,N-dimethylamino)benzyl and 9.5 mg (23 μmol) of 4-[3,5-bis(1,1-dimethylethyl)-4-oxo-2,5-cyclohexadien-1-ylidene]-2,6-bis(1,1-dimethylethyl)-2,5-cyclohexadien-1-one (2,2',6,6'-tetratert-butyldiphenoquinone), were dissolved in 1 ml of benzene-d6 for 1H NMR analysis. 23.7 mg (46 μmol) of B($C_6F_5$) Lewis acid mitigating agent were also added to the reaction mixture. The spectrum clearly showed that oxidation of the Ti(III) complex had occurred. The resulting complex was determined to be

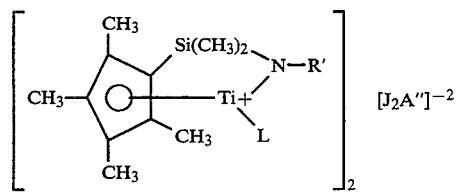

wherein:

L is 2-(N,N-dimethylamino)benzyl, and $[J_2A'']^{-2}$ is:

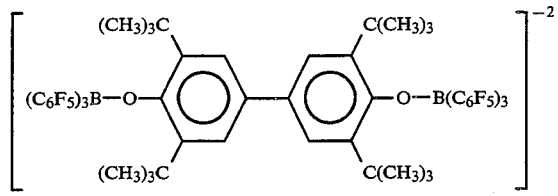

When the above procedure was repeated excepting that no Lewis acid mitigating agent was added, the resulting spectrum clearly showed that oxidation of the Ti(III) complex had occurred to give an asymmetric Ti(IV) complex that was different than that obtained in the presence of the Lewis acid. 1H NMR (C6D6) δ 8 7.61 (s), 7.2–6.8 (m), 4.94 (s), 2.47 (s), 2.33 (s), 2.14 (s), 1.64 (s), 1.50 (s), 1.43 (s), 0.87 (s), 0.74 (s), 0.69 (s) ppm.

EXAMPLE 2

A 2 L stirred reactor was charged with 740 g of mixed alkane solvent (Isopar ™ E, available from Exxon Inc.) and 118 g of 1-octene comonomer. Hydrogen chain transfer agent was added from a 75 ml addition tank at a differential pressure of 170 Kpa. The reactor was heated to 140° C. and saturated with ethylene at 3448 Kpa. Catalyst was prepared in a drybox by adding 2 μmol of (t-butylamido)dimethyl(tetramethyl-$\eta^5$cyclopentadienyl)silanetitanium(III) 2-(N,N-dimethylamino)benzyl in 2 mL of Isopar ™ E to a combination of 1.6 mL of a 0.0050M solution of tris(perfluorophenyl)borane in Isopar ™ E and 0.20 mL of a 0.0050M solution of the diquinone 4-[3,5-bis(1,1-dimethylethyl)-4-oxo-2,5-cyclohexadien-1-ylidene]-2,6-bis(1,1-dimethylethyl)-2,5-cyclohexadien-1-one in Isopar ™ E. The resulting solution was then transferred to a catalyst addition tank and injected into the reactor. The polymerization was allowed to proceed for 15 minutes and the solution was removed from the reactor and quenched with hindered phenol anti-oxidant and isopropanol. The polymer was dried in a vacuum oven to give 16.8 grams of ethylene/1-octene copolymer.

EXAMPLE 3

The polymerization conditions of Example 2 were repeated excepting that 4 mL of a 0.0050M solution of triethylborane mitigating agent in Isopar ™ E was substituted for the tris(perfluorophenyl)borane solution of Example 2. Polymer yield was 13.8 g. of ethylene/-1octene copolymer.

EXAMPLE 4 and 5

A two liter stirred reactor was charged with 660 g of Isopar-E ® and the quantity of 1-octene specified in Table I. Hydrogen was added by differential pressure expansion from a 75 mL addition tank from 2070 Kpa to 1929 Kpa. The contents of the reactor were heated to 100° C. and saturated with ethylene at 3448 Kpa. In a drybox, the desired volume of a 0.0050M solution of buckminsterfullerene oxidizing agent in toluene was added to 1.0 micromoles of (t-butylamido)dimethyl(tetramethyl-$\eta^5$-cyclopentadienyl)silanetitanium(III) 2-(N,N-dimethylamino)benzyl in toluene. In Example 5, Lewis acid mitigating agent, B(C$_6$F$_5$)$_3$, was added as a 0.005M toluene solution. The combined solution was transferred to a catalyst addition tank and injected into the reactor. The polymerization was allowed to proceed for the desired reaction time and the reactor contents were combined with a mixture of anti-oxidant (Irganox 1010 ™ available from Ciba Geigy) and isopropanol. The polymer was dried in a vacuum over overnight at 130° C. Results are contained in Table I.

TABLE I

| Example | Octene (g) | Oxidizing Agent (μmol) | B(C$_6$F$_5$)$_3$ (μmol) | Run Time (min) | Yield (g) |
|---|---|---|---|---|---|
| 3 | 210 | 1.0 | None | 20 | 138 |
| 4 | 200 | 1.0 | 2.0 | 15 | 88 |

What is claimed is:
1. A process for the preparation of a cationic metal complex corresponding to the formula:

$$[Cp_a(ZY)_bML_c^+]_q[J_pA]^{-q},$$

wherein:
Cp independently each occurrence is a cyclopentadienyl group n-bound to M, or a hydrocarbyl, silyl, halo, halohydrocarbyl, hydrocarbylmetalloid or halohydrocarbylmetalloid substituted derivative of said cyclopentadienyl group, said Cp containing up to 50 nonhydrogen atoms, and, when a is 2, optionally both Cp groups may be joined together by a bridging group;
a is 1 or 2;
b is 0 or 1;
cis 1 or 2;
the sum of a, b and c is 3;
Z is a divalent moiety comprising oxygen, nitrogen, phosphorous, boron, or a member of Group 14 of the Periodic Table of the Elements, said moiety having up to 30 nonhydrogen atoms;
Y is a linking group comprising nitrogen, phosphorus, oxygen or sulfur covalently bonded to M and Z through said nitrogen, phosphorus, oxygen or sulfur atom;
L independently each occurrence is hydride, halo, or a monovalent anionic ligand selected from covalently bonded hydrocarbyl, silyl, amido, phosphido, alkoxy, aryloxy, and sulfido groups optionally being further substituted with one or more amine, phosphine, ether, or thioether groups, said ligand having up to 50 nonhydrogen atoms;
M is titanium or zirconium in the +4 oxidation state;
p is an integer from 0 to 4;
q is 1 or 2;
J is the Lewis acid mitigating agent, and
A is a reduced remnant of a neutral organic oxidizing agent and may be ligating or nonligating,
the steps of the process comprising contacting in a noninterfering, noncoordinating solvent at a temperature from −100° C. to 300° C.:
1) a reduced metal precursor complex corresponding to the formula: Cp$_a$(ZY)$_b$M*L$_c$, wherein Cp, Z, Y, L, a, b, and c are as previously defined, and M* is the same metal as M but in a +3 oxidation state;
2) a neutral organic oxidizing agent, A*, capable of accepting one or more electrons and oxidizing M* to M and which in reduced form is A;
and, if A is a ligating group,
3) a Lewis acid mitigating agent, J.
2. A process according to claim 1, wherein the organic oxidizing agent has an electrochemical reduction potential from 0.30 volts more negative than the electrochemical oxidation potential of the desired oxidation to any value more positive than the electrochemical oxidation potential of the desired oxidation.
3. A process according to claim 1 wherein the organic oxidizing agent is an organic compound containing quinone functionality containing up to 50 carbons or a fullerene.
4. A process according to claim 1 wherein the organic oxidizing agent is 2,3,5,6tetramethylbenzoquinone, 2,3,5,6-tetratertbutylbenzoquinone, 2,2',6,6'-tetramethyldiphenoquinone, and 2,2',6,6'-tetratert-butyldiphenoquinone.
5. A process according to claim 1 wherein the Lewis acid mitigating agent is tris(pentafluorophenyl) borane, tris (2,3,5,6-tetrafluorophenyl)borane, tris(2,3,4,5-tetrafluorophenyl)borane, tris(3,4,5-trifluorophenyl)borane, tris(1,2,2-trifluoroethenyl) borane, phenylbis(perfluorophenyl)borane, tris(perfluorophenyl) borate, or triethyl borane.
6. A process according to claim 1 wherein M is titanium.
7. A process according to claim 1 wherein L is a monovalent anionic stabilizing ligand selected from the group consisting of:

1) covalently bonded hydrocarbyl, silyl, amido, phosphido, alkoxy, aryloxy, sulfido groups and mixtures thereof, said group being further substituted with an amine, phosphine, ether, or thioether containing substituent able to form a coordinate-covalent bond or chelating bond with M; said ligand having up to 50 nonhydrogen atoms; and 2) $C_{3-40}$ hydrocarbyl radicals comprising an ethylenic unsaturation able to form an $\eta 3$ bond with M.

8. A process according to claim 1 wherein the complex corresponds to the formula:

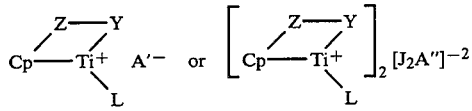

wherein:

L independently each occurrence is a covalently bonded hydrocarbyl group substituted with an amine, phosphine, ether, or thioether containing substituent able to form a coordinate-covalent bond or chelating bond with M, said ligand having up to 50 nonhydrogen atoms, or a $C_{3-40}$ hydrocarbyl radical comprising an ethylenic unsaturation able to form an $\eta 3$ bond with M;

Cp is a cyclopentadienyl or substituted cyclopentadienyl group bound in an $\eta^5$ bonding mode to M;

Z is a divalent moiety comprising carbon or silicon; and

Y is a linking group comprising nitrogen or phosphorus;

J is as previously defined;

A' is a nonligating form of A; and

A'' is a ligating form of A.

9. A process according to claim 8 wherein:

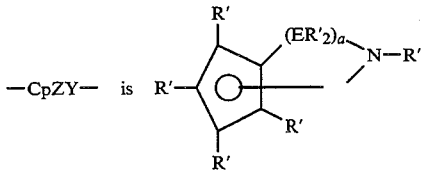

wherein, R' each occurrence is independently selected from the group consisting of hydrogen, silyl, alkyl, aryl and combinations thereof having up to 10 carbon or silicon atoms;

E is silicon or carbon; and a is 1 or 2.

* * * * *